United States Patent Office 3,498,895
Patented Mar. 3, 1970

3,498,895
METHOD OF PREPARING CYCLOALKANONE-OXIME HYDROCHLORIDES
Antonina Alexandrovna Streltsova, Daev per., 31 kv. 12, Moscow, U.S.S.R.
Filed Feb. 14, 1967, Ser. No. 616,095
Int. Cl. C07c 3/24; B01j 1/10
U.S. Cl. 204—162          2 Claims

ABSTRACT OF THE DISCLOSURE

A method of preparing cycloalkanoneoxime hydrochlorides, in which cycloalkanes containing 4 or more carbon atoms are subjected to photochemical nitrosation with nitrosyl chloride in the presence of hydrogen chloride while irradiating with visible light of which substantially all the light energy is concentrated in the thallium spectrum line of 535 m$\mu$, the irradiation being effected with the light produced by a mercury-thallium lamp, in which the pressure of the thallium iodide vapor is 10 to 200 mm. Hg and the pressure of the mercury vapor is 1000 to 20,000 mm. Hg.

---

This invention relates to a method of preparing cycloalkanoneoxime hydrochlorides.

There is a known method of preparing cycloalkanoneoxime hydrochlorides by the photochemical nitrostation of cycloalkanes, having four or more carbon atoms, with nitrosyl chloride in the presence of hydrogen chloride, under irradiation with light in the visible region of the spectrum produced by a mercury vapor lamp.

A disadvantage of the known method is the large consumption of electrical energy which amounts to about 8 kw.-hrs. per kg. of cycloalkanoneoxime.

The object of the present invention is to provide a method of preparing cycloalkanoneoxime hydrochlorides which permits decreasing the consumption of electrical energy.

In accordance with the above and other objects, the present invention consists in irradiation carried out with light produced by a mercury-thallium iodide lamp in which the vapor pressure of the thallium iodide present is from 10 to 200 mm. Hg and the vapor pressure of the mercury is from 1,000 to 20,000 mm. Hg.

Figure 1:
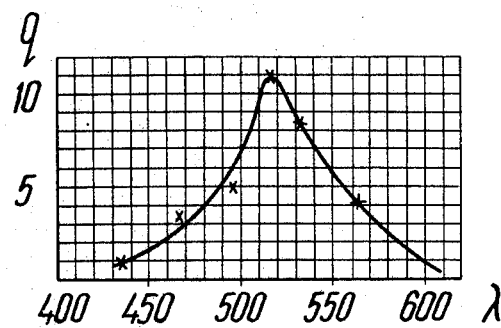
Figure 2:
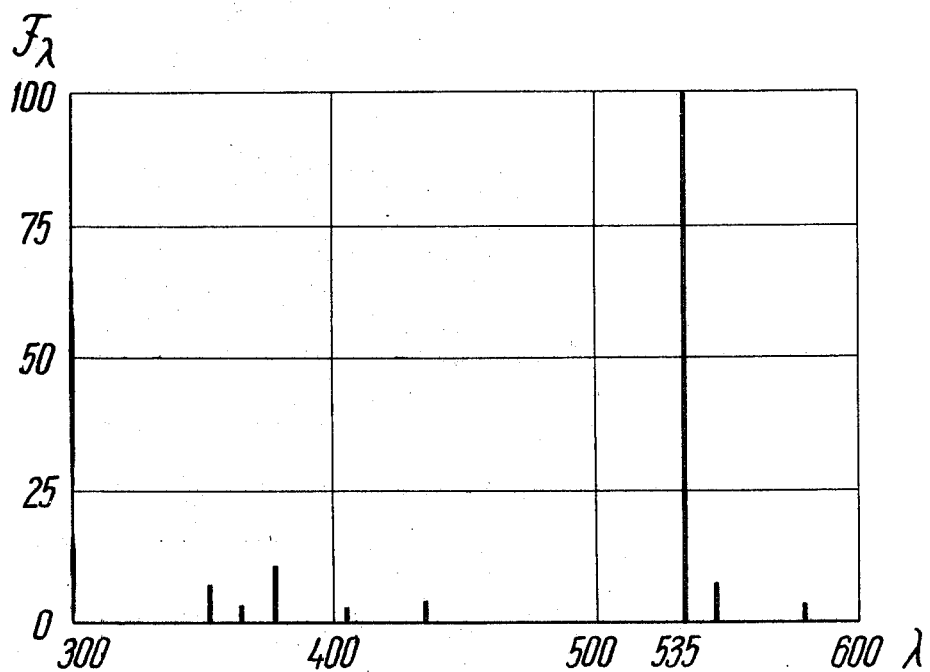

The present method is illustrated in the drawing where FIG. 1 is a curve illustrating the dependence of the yield of cyclohexanoneoxime $q$ in grams per watt hour of light energy on the wave length $\lambda$ in nm., and where FIG. 2 shows the distribution of the radiation energy F$\lambda$ in the spectrum given in comparable units depending on the wave length $\lambda$ in nm. for the above-mentioned mercury-thallium lamp.

From FIG. 2 it is seen, that practically all the light energy is concentrated in the thallium spectrum line ($\lambda$=535 nm.). The high coefficient of the useful radiant effect of the mercury-thallium lamp and also the extremely close correspondence of the wave length of the maximum spectral sensitivity of the photochemical nitrosation reaction of cycloalkanes to the wave length $\lambda$=535 nm. is the reason for the high effectiveness of the mercury-thallium lamp in comparison with the mercury lamp alone.

The following examples are given for a better understanding of the invention.

EXAMPLE 1

To a 40 liter photoreactor, the reaction layer of which has a thickness of 45 mm., there was charged cyclohexane. A mercury-thallium iodide lamp with a thallium iodide vapor pressure of 60–70 mm. Hg, and a mercury vapor pressure of 4,500–5,000 mm. Hg, and a power of 4 kw. was placed in the center of the reactor. The cyclohexane was saturated with hydrogen chloride at a temperature of 10–15° C. for a period of 15 minutes and then nitrosyl chloride was charged until the concentration of the latter reached 0.3 to 0.4% by weight. The lamp was turned on, and nitrosyl chloride was continuously fed at a rate of 4.9 liters per minute and hydrogen chloride at a rate of 10 liters per minute. There was immediately formed an emulsion of an oily cyclohexanoneoxime hydrochloride in cyclohexane, which after 20 minutes began to settle out, after which the end product was drained off either batchwise or continuously.

The level of the solution in the reactor was maintained constant by the addition of pure cyclohexane while the luminous part of the lamp was completely immersed in the reaction solution. After 22 hours there was formed 39.5 kilograms of the end product which contained 60% of cyclohexanoneoxime; 1,1 - chloronitrosocyclohexane was absent. The consumption of electrical energy amounted to 3.7 kw.-hrs. per kg. of cyclohexanoneoxime.

EXAMPLE 2

To a 5 liter photoreactor having a reaction layer thickness of 30 mm., there was added methylcyclohexane. A mercury-thallium iodide lamp having a thallium iodide vapor pressure of 60–70 mm. Hg, and a mercury vapor pressure of 4,500–5,000 mm. Hg and a power of 4 kw. was mounted in the center of the reactor and served as a source of light. The methylcyclohexane was saturated with hydrogen chloride at a temperature of 10–20° C. over a period of 10–15 minutes and then with nitrosyl chloride. The lamp was turned on and nitrosyl chloride was introduced continuously at a rate of 1.5–2.0 liters per minute and hydrogen chloride at rate of 3–4 liters per minute. The end product was continuously drained from the photoreactor. During 10 hours there was obtained 5.2 kg. of the end product with a methylcylohexanoneoxime content of 52%.

The consumption of electrical energy amounted to 3.7 kw.-hrs. per kg. of methylcyclohexanoneoxime.

Although the present invention has been described in accordance with a preferred embodiment, various changes and modifications may be made in carrying out the present invention without departing from the spirit and scope thereof, as will be understood by those skilled in the art.

These changes and modifications are to be considered as falling within the spirit and scope of the invention as defined in the appended claims.

What is claimed is:

1. A method of preparing cycloalkanoneoxime hydrochlorides, said method comprising subjecting cycloalkanes containing 4 or more carbon atoms to photochemical nitrosation with nitrosyl chloride in the presence of hydrogen chloride while irradiating with visible light of which substantially all the light energy is concentrated in the thallium spectrum line of 535 m$\mu$, said visible light being produced by a mercury-thallium iodide lamp in which the pressure of the thallium iodide vapor is 10–200 mm. Hg, and the pressure of the mercury vapor is 1,000–20,000 mm. Hg.

2. A method according to claim 1 wherein the pressure of the thallium iodide vapor is 60–70 mm. Hg and the pressure of the mercury vapor is 4500–5000 mm. Hg.

References Cited

UNITED STATES PATENTS 3,309,298    3/1967    Ito et al. _____ 204—162

HOWARD S. WILLIAMS, Primary Examiner